United States Patent [19]

Iwasaki

[11] 3,730,996

[45] May 1, 1973

[54] TELEPHONE AUXILIARY DEVICE

[75] Inventor: Tadahisa Iwasaki, Sumida-ku, Tokyo, Japan

[73] Assignee: Pioneer Electronic Corporation, Tokyo, Japan

[22] Filed: July 28, 1971

[21] Appl. No.: 166,847

[30] Foreign Application Priority Data

July 29, 1970 Japan ..............................45/75553

[52] U.S. Cl. ..............................................179/1 HS

[51] Int. Cl. ............................................H04m 11/00

[58] Field of Search......................179/1 C, 2 C, 1 HS, 179/5 R

[56] References Cited

UNITED STATES PATENTS

| | | | |
|---|---|---|---|
| 3,319,003 | 5/1967 | Prager | 179/1 HS |
| 3,296,382 | 1/1967 | Klumb | 179/1 HS |
| 3,480,720 | 11/1969 | Aiba | 179/1 HS |
| 3,492,427 | 1/1970 | Foster | 179/1 C |

*Primary Examiner*—Kathleen H. Claffy
*Assistant Examiner*—David L. Steward
*Attorney*—Richard C. Sughrue et al.

[57] ABSTRACT

A telephone auxiliary device has a housing adapted to be seated on a telephone body with a handset removed, the handset being placed on the housing. Within the housing there are disposed a movable plate pivoted at one end to the housing and provided at the other end with an adapter button for detecting a handset; a hook button actuating plate pivoted at its intermediate portion to approximately the center portion of the movable plate, with one end coupled to a plunger responsive to an incoming bell signal and with the other end extending over the hook buttons of the telephone; and a spring to bias the movable plate and the hook button actuating plate into closely adjacent positions. In operation, the hook buttons of the telephone are allowed to move upward, but the handset placed on the telephone auxiliary device is held in a fixed position.

4 Claims, 5 Drawing Figures

INVENTOR

BY

INVENTOR.

BY

TELEPHONE AUXILIARY DEVICE

BACKGROUND OF THE INVENTION

This invention relates to an auxiliary device for a telephone set and, more particularly, to an auxiliary device for an automatic telephone answering device.

Heretofore, there have been known two types of automatic telephone answering devices: one being of the direct type characterized in that the answering device is connected in a circuit directly with the telephone; and the other being of the indirect type characterized in that the circuitry of the telephone set is not disturbed, the indirect type sensing an incoming bell signal and causing hook buttons of the telephone set to rise, whereby the telephone is placed in a talking condition. The present invention relates to an auxiliary device of the indirect type for an automatic telephone answering device.

In the prior art, the indirect type automatic telephone answering devices have employed various mechanisms as a device for sensing an incoming bell signal, allowing rising of the hook buttons of the telephone and maintaining the telephone in the talking condition. In one of these mechanisms, a lever is inserted between a cradle and a handset of the telephone set and, in response to the bell signal, a solenoid is energized so as to move upwardly one end of the lever to thereby lift the handset seated on the lever, whereby there results the same condition as that caused by a manual handset pickup operation. In such a mechanism, there is a possibility that the handset may be moved off its position on the lever owing to the sudden actuation of the lever by the solenoid, so that after termination of the communication the handset will not be restored onto the cradle. Thus, the hook buttons remain in the raised or open position with the result that no further communication can be effected and the principal object of the automatic telephone answering device cannot be achieved.

Another answering device that has been used involves a structure, generally called "an induction box," characterized in that the auxiliary device is mounted on the cradle of the telephone and the handset is seated on that auxiliary device. It operates in response to an incoming bell signal so as to cause the hook buttons alone to rise, while the handset is not moved, to thereby place the telephone in a talking condition. However, such devices have been complex in structure and bulky, and thus expensive and difficult to manufacture and repair.

In view of the foregoing, it is an object of the present invention to provide a telephone auxiliary device which is reliable in operation, compact and easily manipulatable, and which is not subject to any of the disadvantages of the prior art devices.

SUMMARY OF THE INVENTION

The present invention relates to the indirect type of automatic telephone answering device, and resides in a telephone auxiliary device which comprises a housing adapted to be seated on a cradle of the telephone and having a handset receiving base for receiving thereon the handset of the telephone, a movable plate having its one end pivoted to the inside of the housing and the other end provided with an adapter button for detecting the presence of the handset on the handset receiving base, a hook button actuating plate pivoted at its intermediate portion to the movable plate and having end portions extending over the hook buttons of the telephone, a spring for urging the movable plate and the hook button actuating plate into closely adjacent positions, and a plunger coupled to the other end of the hook button actuating plate for separating the movable plate and the hook button actuating plate against the force of the spring.

DESCRIPTION OF THE PREFERRED EMBODIMENT

Figure 1:
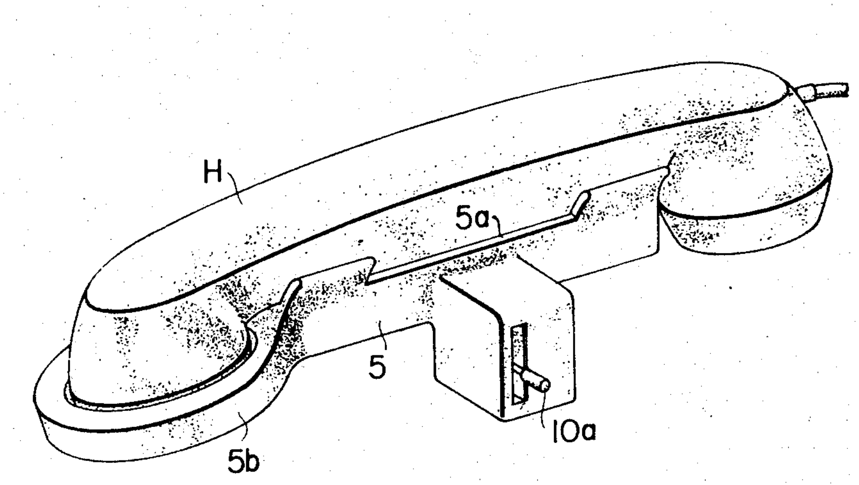
FIG. 1 is a perspective view of a telephone auxiliary device according to the present invention with a handset placed thereon.
Figure 2:
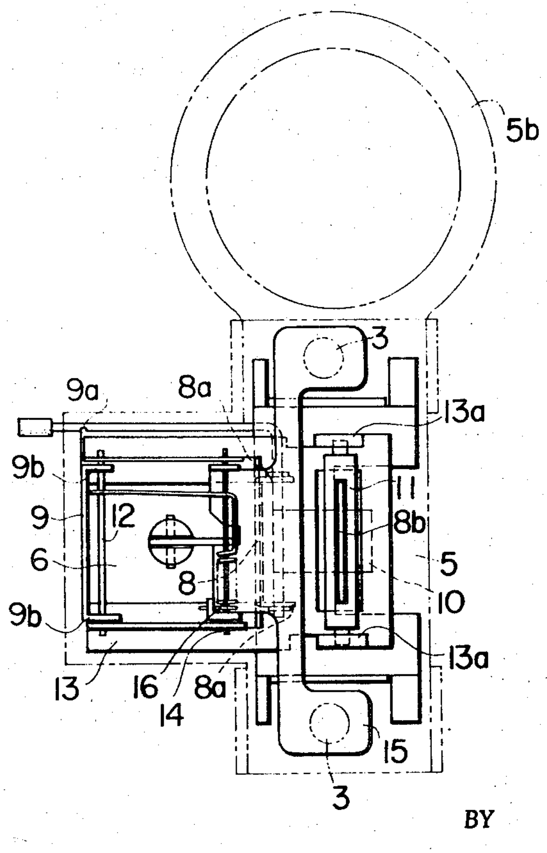
FIG. 2 is a bottom plan view of the auxiliary device according to the present invention, with parts broken away.

Referring to the drawings, illustrating a preferred embodiment of the telephone auxiliary device in accordance with the present invention, there is shown a telephone set 1 including a cradle portion 2, which has hook buttons 3 and springs 4 disposed inside the telephone body 1 for urging the hook buttons 3 upwardly. Reference numeral 5 represents a housing of the auxiliary device which has in its upper part a handset receiving base 5*a* on which a handset H is placed, and a ring portion 5*b* including a coil to perform electro-magnetically telephone communication. The structure of the auxiliary device is described in detail hereinafter.

Figure 3:
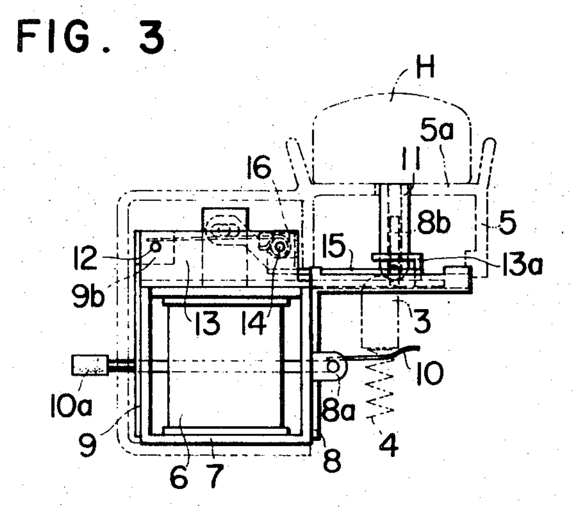
FIG. 3 is a front elevational view of the auxiliary device, with parts broken away.
Figure 4:
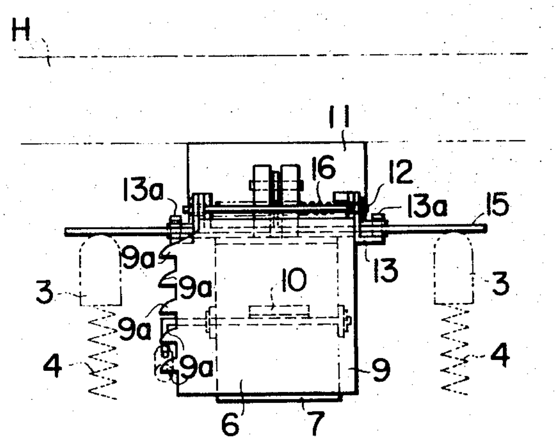
FIG. 4 is a side elevational view of the auxiliary device, with parts broken away.

In FIG. 3, a plunger 6 has a frame 7 to which a first supporting plate 8 and a second supporting plate 9 are fixed at both sides. The first supporting plate 8 supports an auxiliary device holding member 10 through a pivot 8*a*, and also supports an erect portion 8*b* on which an adapter button 11 is slidably mounted for up and down movement. As shown in FIG. 4, the second supporting plate 9 is formed with a plurality of teeth or claws 9*a* for engagement with one end of the auxiliary device holding member 10 and pivotably supports a movable plate 13 at 9*b*, 9*b* on an axis 12. The movable plate 13 holds the adapter button 11 by a key portion 13*a* and pivotably supports a hook button actuating plate 15 on an axis 14.

Figure 5:
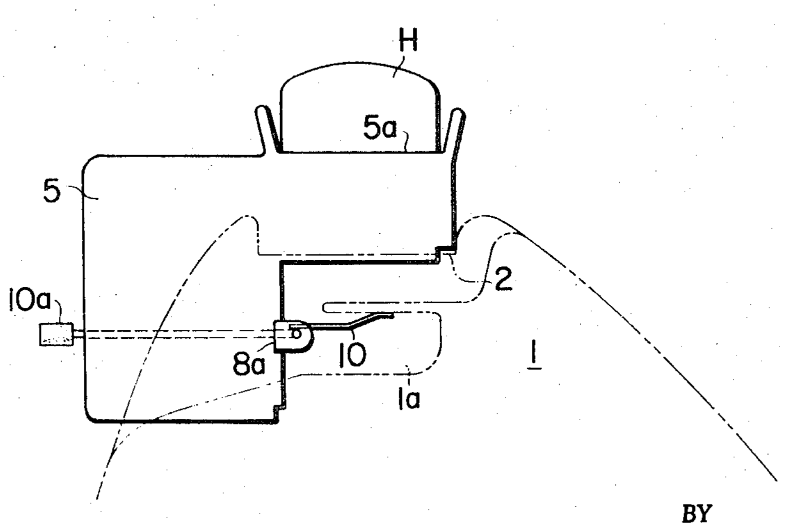
FIG. 5 is a front elevational view of the auxiliary device mounted on a telephone body.

The hook button actuating plate 15 is coupled at one end to the plunger 6, the other end having two portions extending oppositely leftward and rightward, so that these two portions are located, respectively, over the hook buttons 3, 3 of the telephone. The hook button actuating plate 15 is biased in the clockwise direction, as viewed in FIG. 3, by a coil spring 16 provided about the axis 14. Thus the movable plate 13 and the hook button actuating plate 15 are urged, with the axis 14 as the center, into closely adjacent positions. One end of the auxiliary device holding member 10 extends so as to engage one of the claws 9*a* formed on the second supporting plate 9, and the other end is made of an elastic plate and projects into a recess $1a$ of the telephone body 1 such that the auxiliary device is held fixedly on the cradle portion 2, as shown in FIG. 5.

In operation, the auxiliary device is seated on the cradle 2 with the handset removed. Fixation of the auxiliary device onto the cradle 2 will be effected by inserting the elastic plate of the other end of the holding member 10 into the recess $1a$ of the telephone body 1 while lifting the one end $10a$ of the same, and engaging the one end $10a$ of the holding member with the appropriate one of the claws $9a$ of the second supporting plate 9 while lowering the same. Thereafter, the handset H is seated on the handset receiving base $5a$ of the auxiliary device. At this time, the receiver section of the handset is positioned inside the transmitting and receiving ring portion $5b$ of the housing 5, as shown in FIG. 1.

As the handset H is positioned on the handset receiving base 5a, the adapter button 11 is lowered and the movable plate 13 supporting the adapter button 11 is pivoted about the axis 12. Thus, the hook button actuating plate 15, pivoted on the axis 14 to the movable plate 13, moves downward in unison with the movable plate 13 by means of the coil spring 16. Therefore, the hook buttons 3 are pushed down by the hook button actuating plate 15, whereby the telephone is placed in an "off" or non-talking condition.

When an incoming bell signal occurs, a circuit (not shown) senses it electro-magnetically, whereby the automatic telephone answering device is operated to energize the solenoid plunger 6 for downward movement. Thus, the hook button actuating plate 15 is pivoted about the axis 14 in the counterclockwise direction (as seen in FIG. 3) against the force of the coil spring 16 and, then, the hook buttons 3 are moved upward by the springs 4 to thereby place the telephone in the talking condition. At this time, the plunger 6 causes the axis 14 on the movable plate 13 to move downwardly, that is, the movable plate 13 is forced to rotate about the axis 12 in the clockwise direction or downwardly (as see in FIG. 3) and, thus, the movable plate 13 is urged toward the first supporting plate 8. During this operation, the handset H is held stably on the handset receiving base $5a$ of the housing 5. In the talking condition, incoming messages and answering messages are transmitted electro-magnetically between the receiver section of the handset H and the ring portion 5 $b$ of the auxiliary device.

When the communication has terminated the plunger 6 is deenergized and the hook button actuating plate 15 is rotated in clockwise direction (as seen in FIG. 3) by the coil spring 16. Thus, the hook buttons 3 are again pushed downwardly into the non-talking or stand-by condition.

On the other hand, when the handset H is picked up by one's hand, the hook buttons 3 are pushed upwardly by the springs 4, and the hook button actuating plate 15 and the movable plate 13 are moved upward in unison, with the axis 12 as the center.

The present invention has the structure and operates in the manner stated above. More particularly, it has the structure in which the movable plate 13 is pivoted to the supporting plate, the hook button actuating plate 15 is pivoted to the intermediate portion of the movable plate 13, and the coil spring 16 is mounted so that the movable plate and the hook button actuating plate are urged into closely adjacent positions. Consequently, the movable plate 13 is not subjected to an upward moving force even if the hook button actuating plate 15 is moved upwardly by means of the plunger 6. Thus, the handset H is always held stably on the handset receiving base $5a$ of the housing and there is no possibility of the handset being unintentionally removed from the receiving base $5a$.

Further, in accordance with the foregoing structure, the movable plate 13 and the hook button actuating plate 15 are normally held in closely adjacent positions, so that the gap between the hook buttons 3 and the handset H will be sufficient to allow the hook buttons to move up and down, with the result that the present auxiliary device can be manufactured in a very small size and is easy to manipulate. Moreover, the present auxiliary device can be fixed on the cradle by inserting the holding member 10 into the recess 1a of the telephone body and engaging the other end of the same with the claws $9a$ of the second supporting plate 9, so that handling of the auxiliary device is very easy.

Additionally, the communication is effected electromagnetically through the ring portion $5b$ located in a portion of the housing 5, so that an external noise does not influence the automatic telephone answering device for recording incoming messages and reproducing answering messages. Thus, the present auxiliary device can be installed without any problems in any place where there is a large noise factor. Also, since the transmitter section of the handset is unrestrained, the manual picking up of the handset is very easy, so that there is no interference with the normal usage of the telephone under the condition where the present auxiliary device is mounted on the telephone.

What is claimed is:

1. An auxiliary device for a telephone having a cradle, hook portions and a handset, said device comprising a housing adapted to be seated on a cradle of the telephone and having a handset receiving base for receiving thereon the handset of the telephone, a movable plate having its one end pivoted inside of said housing and the other end provided with an adapter button for detecting the presence of the handset on said handset receiving base, a hook button actuating plate pivoted at its intermediate portion to said movable plate and having end portions at one end thereof extending over the hook buttons of the telephone, means for urging said movable plate and said hook button actuating plate toward each other, and solenoid means coupled to the other end of said hook button actuating plate for separating said movable plate and said hook button actuating plate against the force of said urging means, thereby to move the end portions of the hook button actuating the plate upwardly to release the hook buttons.

2. The auxiliary device of claim 1 wherein said urging means is a spring.

3. The auxiliary device of claim 1 wherein the housing has a ring portion for receiving the receiver section of the telephone handset and said ring portion has electromagnetic coil means, for transmitting and receiving telephone messages.

4. The auxiliary device of claim 1 wherein the housing has means for releasably connecting it to the telephone.

* * * * *